Figure 1:
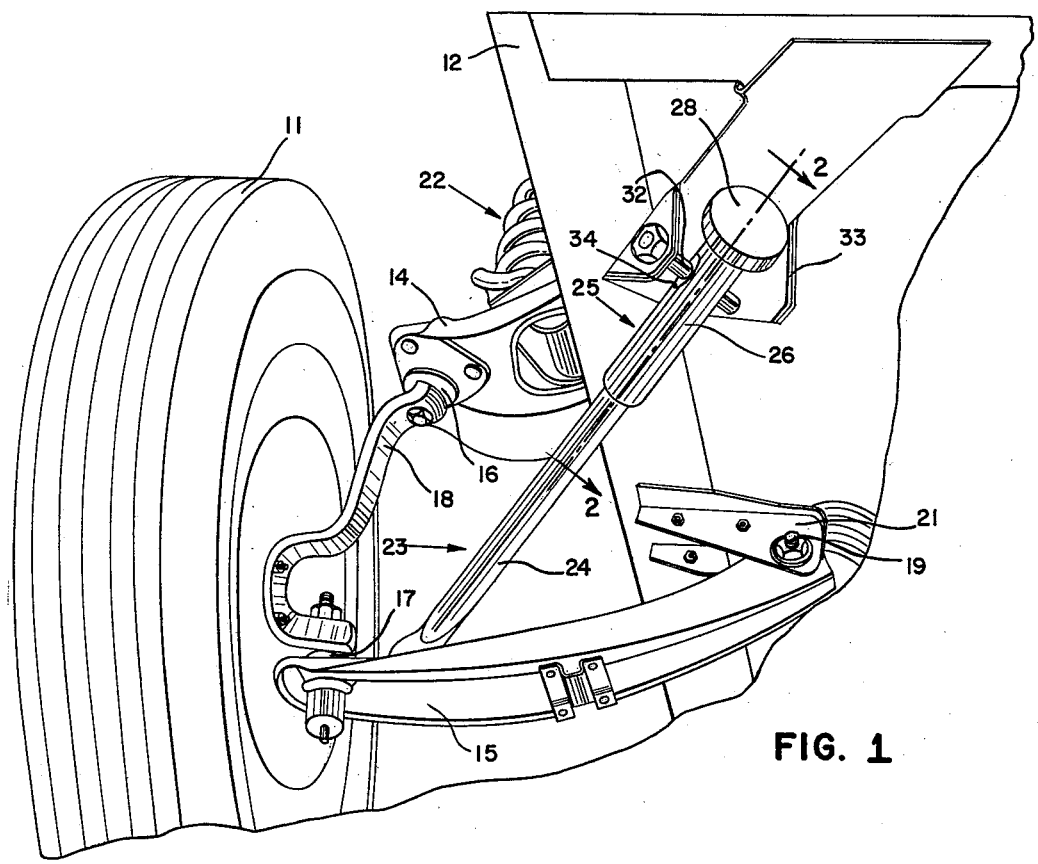

March 26, 1963     H. C. CUSKIE     3,083,032

AUTOMOTIVE SUSPENSION SYSTEM

Filed Aug. 2, 1961

HERMAN C. CUSKIE
*INVENTOR.*

BY John R. Faulkner
Clifford L. Sadler

ATTORNEYS

United States Patent Office 3,083,032
Patented Mar. 26, 1963

3,083,032
AUTOMOTIVE SUSPENSION SYSTEM
Herman C. Cuskie, Birmingham, Mich., assignor to Ford Motor Company, Dearborn, Mich., a corporation of Delaware
Filed Aug. 2, 1961, Ser. No. 128,891
5 Claims. (Cl. 280—96.2)

This invention relates to an automotive suspension system and more particularly to a suspension system that prevents ride harshness by permitting viscously damped fore and aft wheel movement.

In conventional automotive suspension systems, the chassis is resiliently supported to permit vertical wheel movement when road shocks and bumps are encountered. Spring and shock absorbers are interposed between the wheel and chassis structure to isolate these forces from the passengers. It is well known, however, that the force exerted by a bump or obstacle on a wheel in motion has both vertical and horizontal force components. Conventional suspension systems provide no way of isolating the horizontal force component from the passengers and an undesirable ride characteristic known as "harshness" results.

Suspension systems have been proposed in which ride harshness is eliminated by permitting the wheel to recede slightly when road shocks having horizontal force components are encountered. This type of suspension system may be generally termed a "compliance suspension."

Some mechanism must be employed in compliance suspensions to return the wheel to its normal position when the horizontal force is removed and, for best results, there should be damping of the horizontal wheel movement. Conventionally these functions are accomplished by resilient bushings that are positioned between various suspension components and the chassis structure.

The resilient bushings in addition to controlling wheel recession due to road shocks, must also counteract the horizontal forces encountered at the wheel during acceleration or deceleration. These forces are frequently severe and the resilient bushings cannot permit a satisfactory degree of compliance or recession under light loads and also absorb these additional loads. Further, the bushing is not sufficiently self-damping and wheel shudder or shake may result.

In view of the state of the art, it is an object of the present invention to provide a suspension system that permits a controlled degree of wheel recession to reduce ride harshness.

It is the further object of this invention to provide a compliance suspension system that eliminates wheel shuddrer and shake by having a high degree of horizontal damping at all loads without penalizing harshness reduction.

In the presently preferred embodiment of the instant invention, a suspension control arm is supported to permit horizontal wheel recession in addition to allowing the vertical wheel movement. A drag strut is operatively connected between a sprung chassis member and the control arm to maintain alignment during both horizontal recession and vertical deflection of the arm. The drag strut is extensible and has an integral viscous damper and centering springs to control the rate of wheel recession and to return the wheel to its normal position once the horizontal force is removed.

Figure 2:
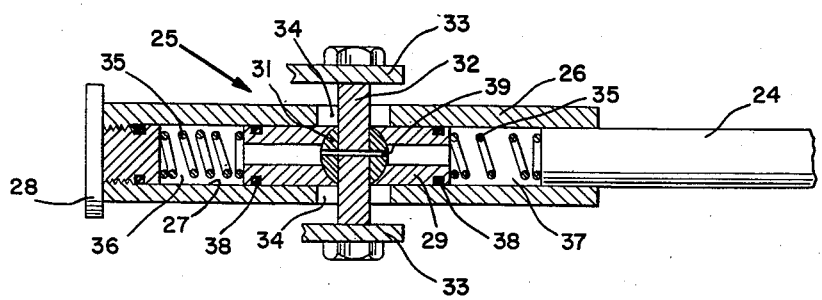

Further objects and advantages of this invention will become more apparent as this description proceeds particularly when considered in conjunction with the accompanying drawings, wherein:

FIGURE 1 is a perspective view from beneath of the front portion of a motor vehicle incorporating the present invention; and FIGURE 2 is a cross-sectional view taken along line 2—2 of FIGURE 1.

Referring now in detail to the drawings and in particular to FIGURE 1, an automotive independent front wheel suspension system is shown. In the illustrated construction, a wheel 11 is suspended for movement relative to a chassis member 12 by an upper control arm 14 and a lower control arm 15. At the outer ends of the control arms 14 and 15, upper and lower ball joint assemblies 16 and 17 respectively support a spindle 18. The wheel 11 is rotatable on the spindle 18.

The control arms 14 and 15 are pivoted at their inboard ends on the chassis member 12 to allow vertical movement of the wheel 11 and spindle 18 when road shocks are encountered. The pivotal connection for the upper control arm 14 is conventional and not shown. The lower control arm 15 is pivotally supported on a pivot pin 19 that is affixed to a frame bracket 21. The frame bracket 21 is welded or riveted to the chassis member 12. Vertical wheel shocks are isolated from the passengers by a spring and viscous shock absorber assembly indicated generally at 22. The spring and shock absorber 22 are connected between the upper arm 14 and the vehicular chassis in a known manner.

The lower control arm 15 is suspended on the pivot pin 19 to permit slight movement in a horizontal direction in addition to the normal vertical movement. For this purpose, a resilient bushing (not shown) is interposed between the arm 15 and the pivot pin 19. When the wheel 11 encounters road shocks, the horizontal component of the force will cause the lower control arm 15 to move slightly in a rearward direction by deformation of the rubber bushing. The wheel 11 will thereby recede slightly.

It has been found that the resilient bushing positioned between the lower control arm 15 and its pivot pin 19 is not sufficiently rigid to completely control the horizontal movement of the lower control arm 15 and the wheel 11. A drag strut assembly, indicated generally at 23, is interposed between the lower control arm 15 and the chassis member 12 to control the rate of wheel recession and to return the lower control arm 15 to its normal position once the horizontal force is removed. The drag strut assembly 23, in addition, resists relative movement between the wheel 11 and the chassis member 12 during severe acceleration and deceleration.

The drag strut assembly 23 includes a forged bar 24 which is connected at one end to the lower control arm 15. Bar 24 receives the horizontal loads exerted upon the lower control arm 15 due to recession of the wheel 11. The damping and centering structure indicated generally at 25 and in more detail in FIGURE 2 acts as a reaction member in receiving the loads from the bar 24 and isolates the loads from the passengers and the chassis member 12.

The bar 24 is rigidly secured to a cylindrical member 26 having an internal bore 27. The bore 27 is closed at one end by the bar 24 and at the other end by a threaded plug 28. A socket member 29 is received in the bore 27. The socket member 29, in turn, receives a ball 31. The ball 31 is supported on a pin 32 which is supported in a bracket 33 welded or otherwise secured to the chassis member 12. The ball and socket connections permits unrestricted pivotal movement of the strut assembly 23 during vertical movement of the lower control arm 15.

Longitudinal slots 34 are formed in the cylinder 26 to permit clearance for the pin 32 during longitudinal movement of the strut bar 24 and the cylinder 26 upon recession of the wheel 11. Centering springs 35 contained in the bore 27 return wheel 11 to its normal position once the horizontal forces are removed.

The ball 31 divides the bore 27 into two separate chambers 36 and 37 in which hydraulic fluid is contained.

The O-ring seals 38 compressed between the socket 29 and the bore 27 prevent leakage of the hydraulic fluid. A restricted orifice 39 is formed in ball 31 and in the pin 32. As the strut assembly 23 moves longitudinally during wheel recession, fluid is forced between the chambers 36 and 37 through the orifice 39. This results in viscous damping that is sufficient to control the rate of wheel recession over a wide variance of loads and effectively attenuate wheel shudder and shake.

It is to be understood that the construction shown and described is exemplary only of a preferred form of the invention. Various changes and modifications may be made without departing from the spirit of the invention. For example, chassis member 12 may be either a portion of the frame of the conventional frame type vehicle, or a suitable structural member of a unit type vehicle. In addition, the invention is not limited to the type of independent suspension system shown, but may be utilized with other suspension arrangements. Various other changes and modifications may be made without departing from the spirit and scope of the invention as defined by the appended claims.

What is claimed is:

1. In a vehicular suspension system, an unsprung member, a sprung member, suspension means supporting said unsprung member for vertical and horizontal movement relative to said sprung member, a drag strut assembly controlling the horizontal movement of said unsprung member, said drag strut assembly comprising a cylinder operably connected for movement in a substantially axial direction upon horizontal movement of said unsprung member, means supported within said cylinder dividing said cylinder into two fluid chambers, said means being constructed to permit restrained fluid flow between said chambers upon axial movement of said cylinder, and means supporting said last named means on said sprung member to permit pivotal movement of said strut assembly upon vertical movement of said unsprung member while restraining axial movement of said last named means upon horizontal movement of said unsprung member.

2. In a vehicular suspension system, a wheel, a spindle rotatably supporting said wheel, a chassis structural member, suspension means supporting said spindle for vertical and horizontal movement relative to said chassis structural member, a drag strut assembly for controlling the horizontal movement of said spindle, said drag strut assembly comprising a cylinder operably connected for movement in a substantially axial direction upon horizontal movement of said spindle, means supported within said cylinder dividing said cylinder into two fluid chambers, said means being constructed to permit restricted fluid flow between said chambers upon axial movement of said cylinder, and means supporting said last named means on said structural member to permit pivotal movement of said strut assembly upon vertical movement of said spindle while restraining axial movement of said last named means upon horizontal movement of said spindle.

3. In a vehicular suspension system, a wheel, a spindle rotatably supporting said wheel, a chassis structural member, a control arm supporting said spindle, means supporting said control arm upon said structural member for pivotal movement in vertical and horizontal directions, drag strut means operably connected between said control arm and said structural member to control the horizontal movement of said control arm, said drag strut means comprising a cylinder operably connected for movement in a substantially axial direction upon horizontal movement of said control arm, means supported within said cylinder dividing said cylinder into two fluid chambers, said means being constructed to permit restrained fluid flow between said chamber upon axial movement of said cylinder, the operable connection between said drag strut and said structural member consisting of a ball and socket connection between said structural member and said last named means to permit pivotal movement of said drag strut means upon vertical pivotal movement of said control arm while restraining said last named means from axial movement upon axial movement of said cylinder.

4. In a vehicular suspension system, a wheel, a spindle rotatably supporting said wheel, a chassis structural member, a control arm supporting said spindle, means supporting said spindle, means supporting said control arm on said structural member for pivotal movement in vertical and horizontal directions, a cylinder operably connected to said control arm for movement therewith, socket means slidably contained within said cylinder, a ball rotatably received within said socket means dividing said cylinder into two fluid chambers, means in said ball permitting restricted fluid flow between said chambers upon movement of said cylinder in an axial direction, and means operably connecting said ball to said chassis structural member whereby said cylinder may pivot relative thereto upon vertical pivotal movement of said control arm.

5. In a vehicular suspension system, a wheel, a spindle rotatably supporting said wheel, a chassis structural member, a control arm supporting said spindle, means supporting said control arm on said structural member for pivotal movement in vertical and horizontal directions, a cylinder operably connected to said control arm for movement therewith, socket means slidably contained within said cylinder, centering spring means received in said cylinder resisting movement of said socket means, a ball rotatably received within said socket means dividing said cylinder into two fluid chambers, means in said ball permitting restricted fluid flow between said chambers upon movement of said cylinder in an axial direction, and means operably connecting said ball to said chassis structural member whereby said cylinder may pivot relative thereto upon vertical pivotal movement of said control arm.

References Cited in the file of this patent

UNITED STATES PATENTS

| | | |
|---|---|---|
| 1,046,338 | Schou | Dec. 3, 1912 |
| 1,089,002 | Lyon | Mar. 3, 1914 |
| 1,928,816 | Grayson | Oct. 3, 1933 |
| 2,596,922 | Thoms | May 13, 1952 |
| 2,805,868 | Madden | Sept. 10, 1957 |